UNITED STATES PATENT OFFICE.

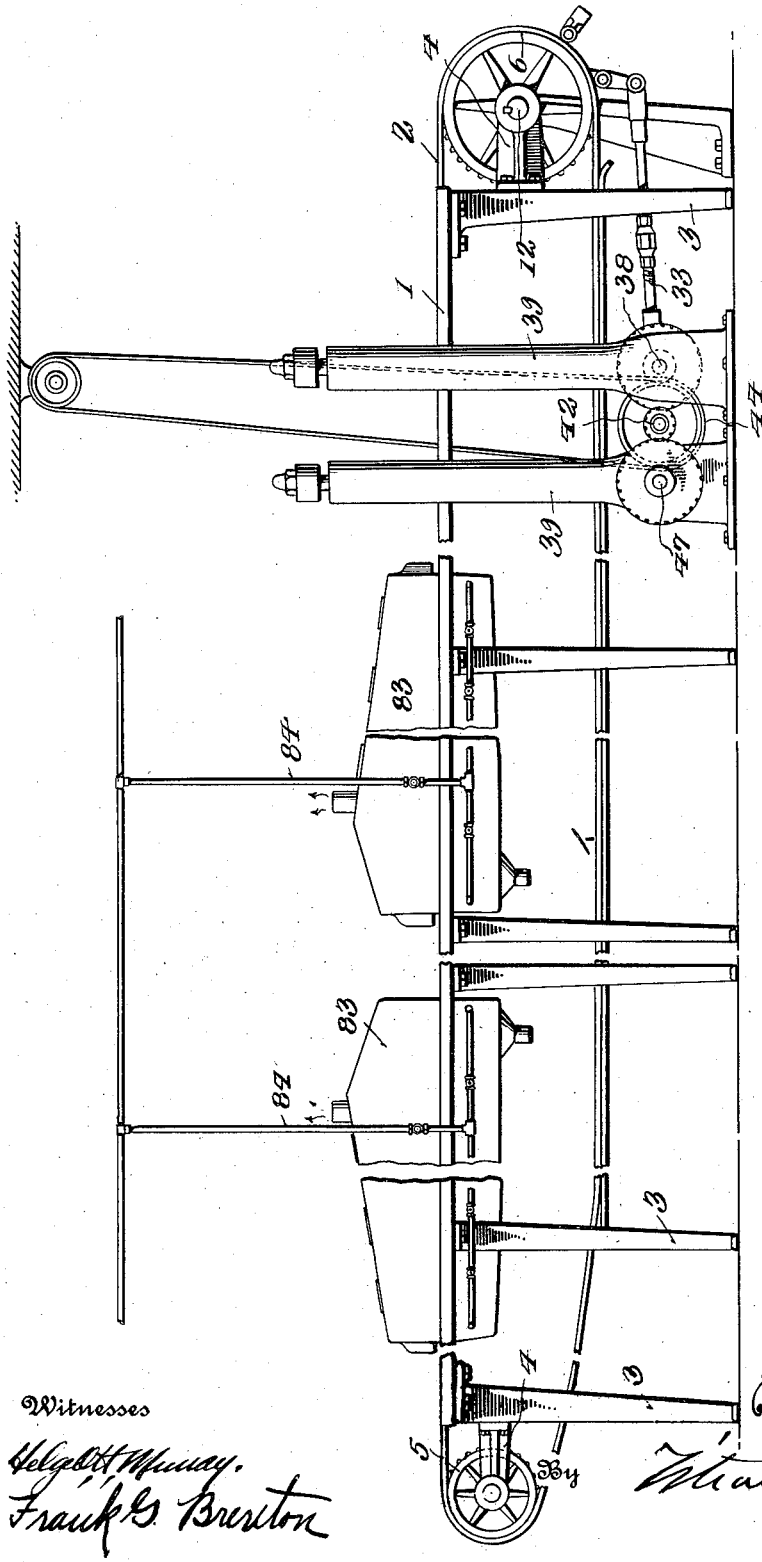

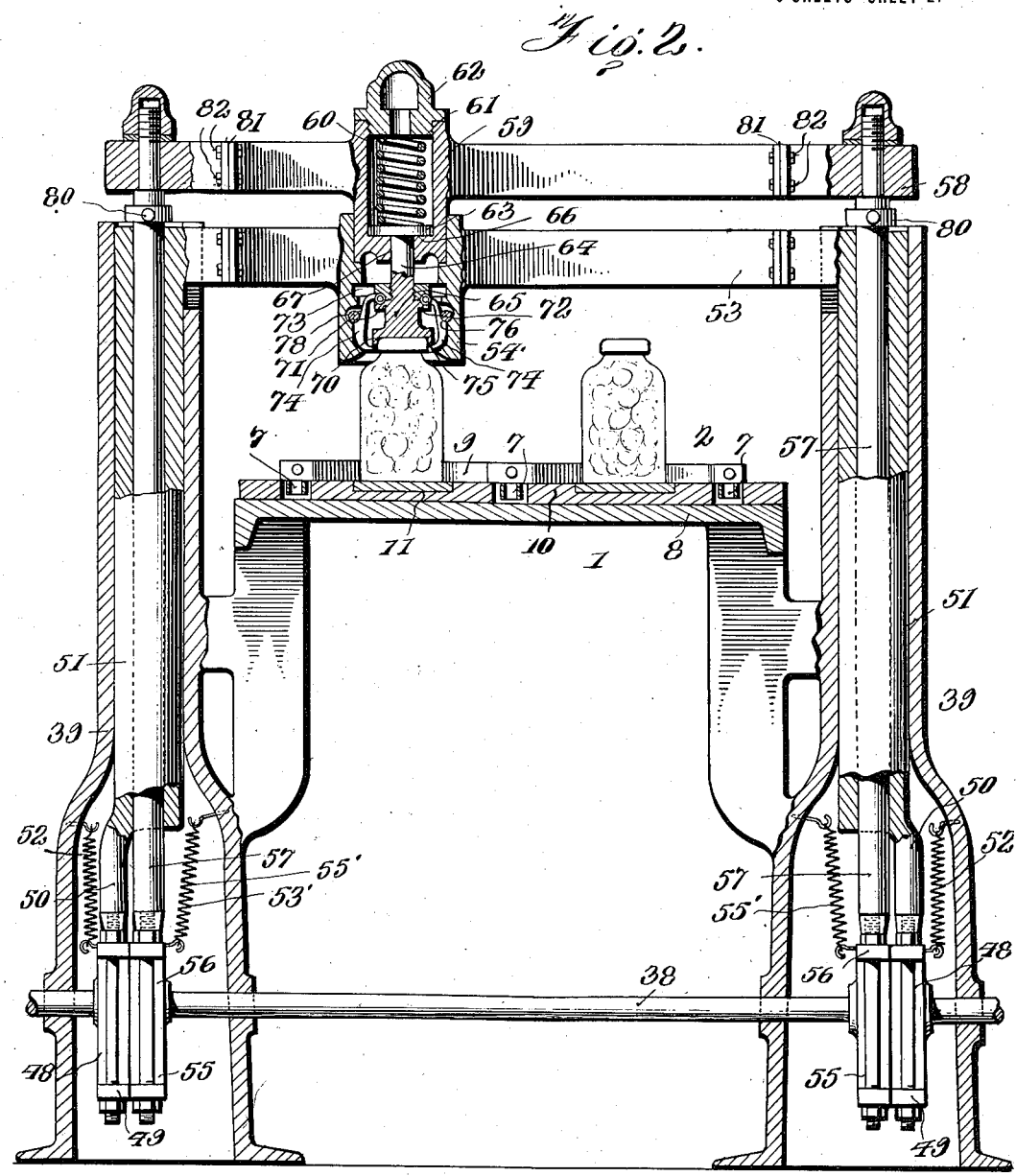

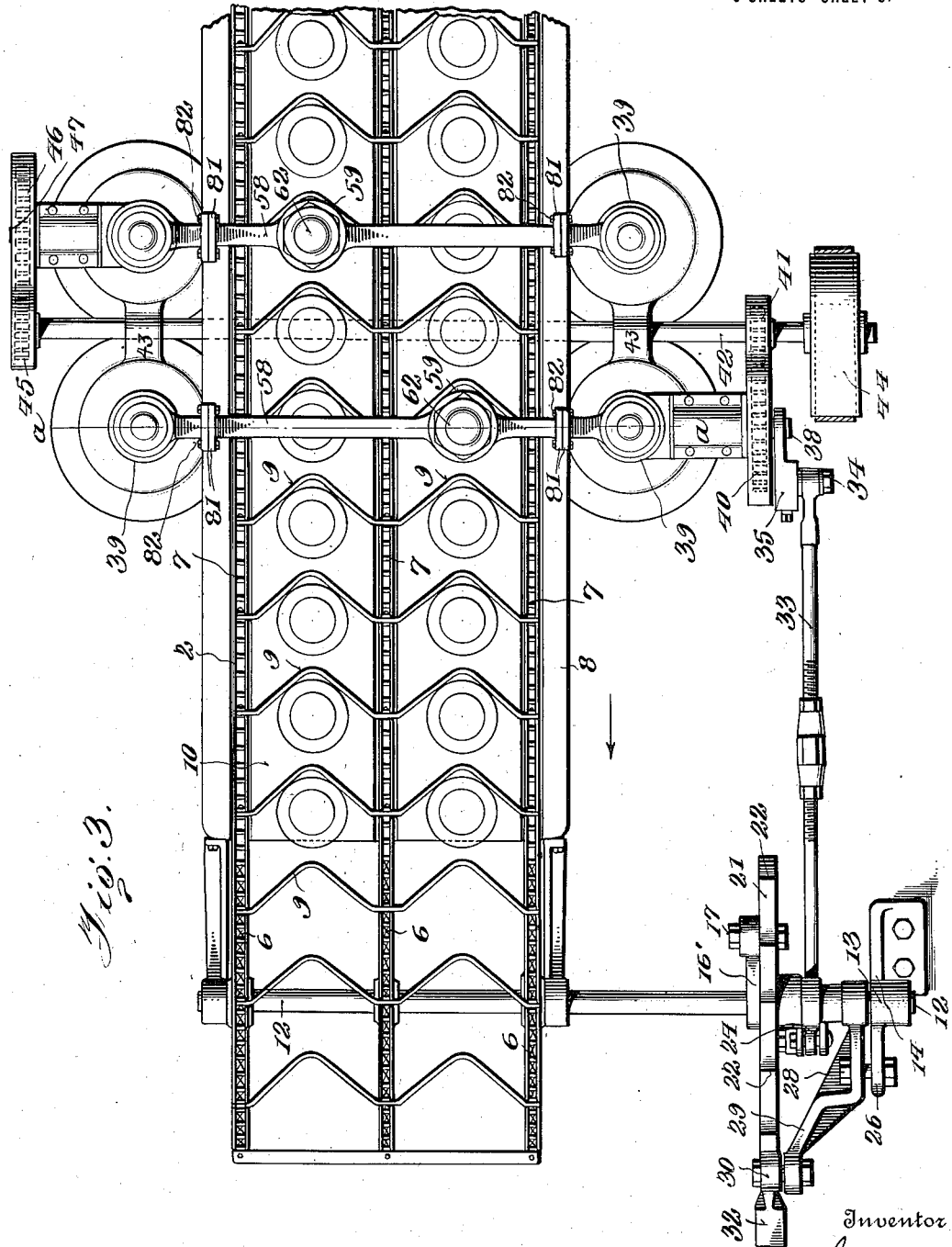

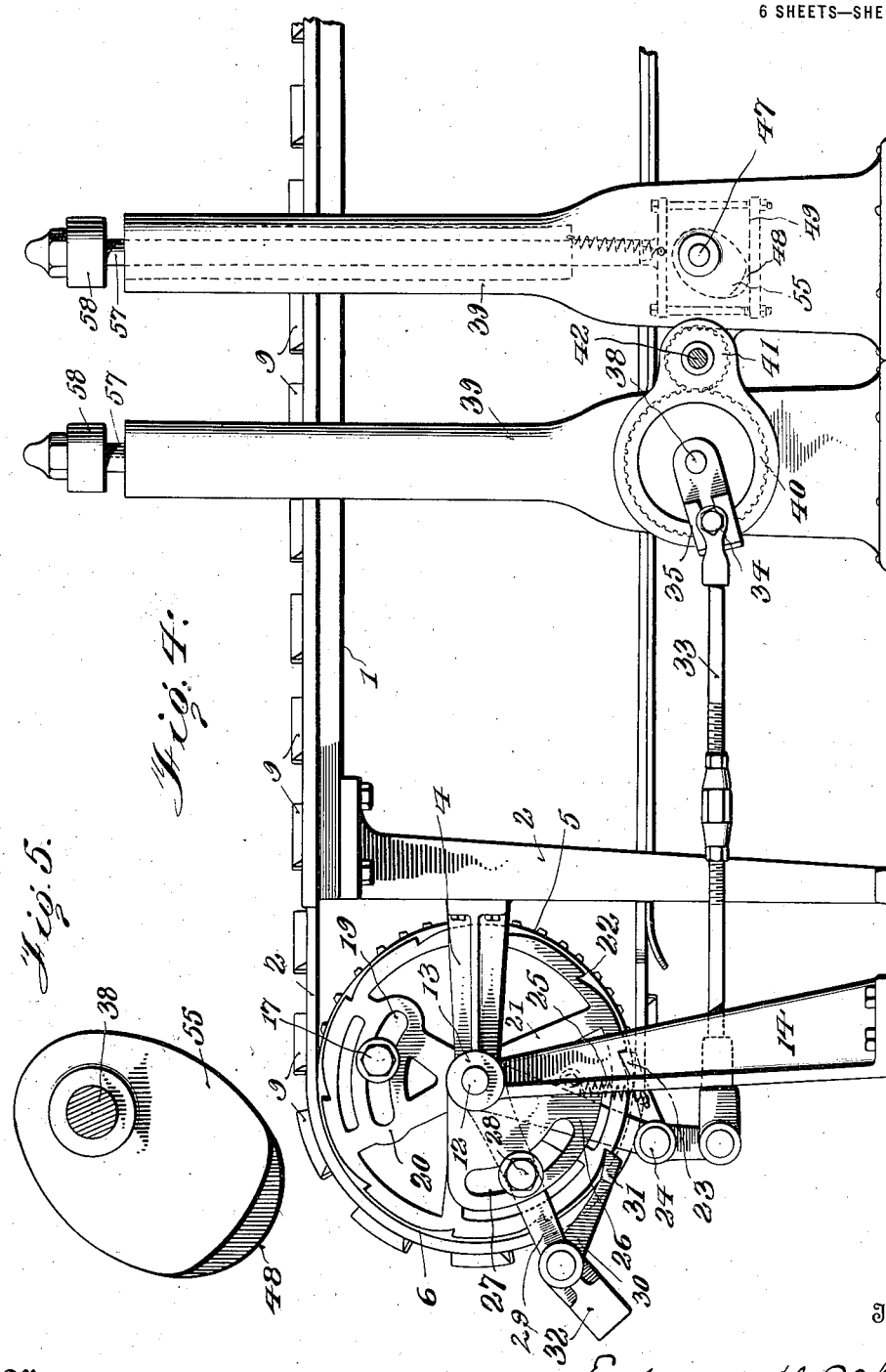

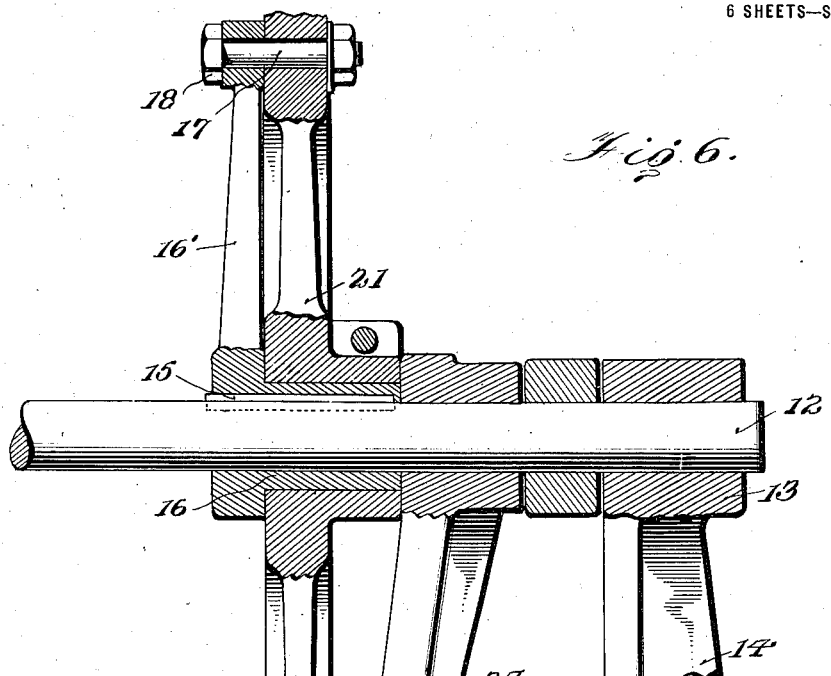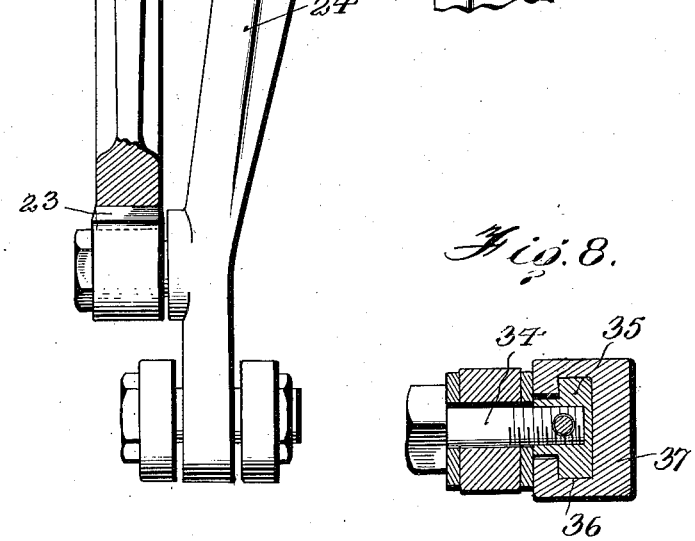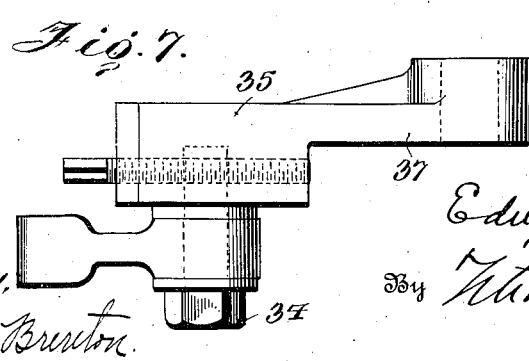

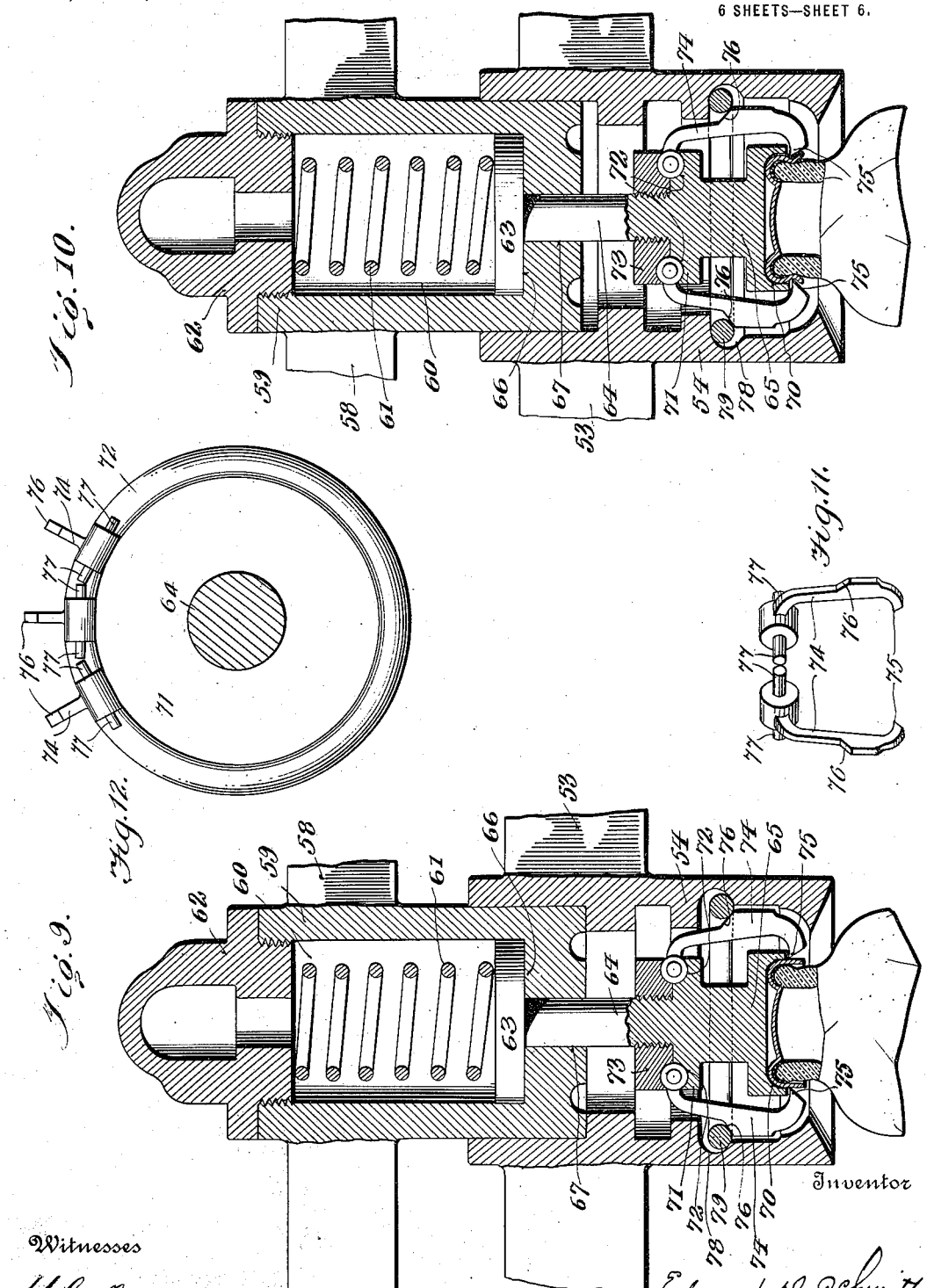

EDWARD D. SCHMITT, OF BALTIMORE, MARYLAND, ASSIGNOR, BY MESNE ASSIGNMENTS, TO THE AMERICAN PURE FOOD PROCESS COMPANY, OF BALTIMORE, MARYLAND, A CORPORATION OF DELAWARE.

JAR-CAPPING MACHINE.

1,195,611.  Specification of Letters Patent.  Patented Aug. 22, 1916.

Application filed September 19, 1911. Serial No. 650,298.

*To all whom it may concern:*

Be it known that I, EDWARD D. SCHMITT, a citizen of the United States, residing at Baltimore city, State of Maryland, have invented certain new and useful Improvements in Jar-Capping Machines, of which the following is a specification.

The invention relates generally to machines for applying caps to bottles or jars, but more particularly to means for feeding or conveying the bottles or jars to the capping or sealing devices; and its chief object is to provide a novel mechanism by which the bottles or jars may be fed to the capping devices with a step-by-step movement, and which mechanism can be readily adjusted to enable capping devices to operate upon bottles of varying diameters, a most important feature in packing food products in glass jars.

In the drawings, Figure 1 is a side elevation of the machine complete, the same being somewhat foreshortened by breaking parts away. Fig. 2 is a transverse section of the machine, taken about on line *a—a* of Fig. 3. Fig. 3 is a top plan view of the machine, parts being broken away. Fig. 4 is an enlarged side elevation of one end of the machine. Fig. 5 is a face view of the head operating cams. Fig. 6 is a broken sectional view of the spacing wheel and adjacent parts. Fig. 7 is a detail top edge view of the adjustable crank arm to which the connecting rod for operating the space-wheel is connected. Fig. 8 is a cross section of the crank and portion of the pitman rod connection. Fig. 9 is an enlarged view of the sealing head. Fig. 10 is an enlarged vertical section of one of the sealing or capping heads, showing the position of the parts at the beginning of the crimping operation, and Fig. 11 is a detail of two of the indenting fingers in elevation. Fig. 12 is a top plan view of the sealing plunger with the retaining ring removed to display the manner in which the seal indenting fingers are disposed in a circular guideway in the plunger.

Referring to the drawings, the numeral 1 represents the supporting frame for the conveyer 2. This frame is provided with a number of legs 3, the end legs being provided with brackets 4, in which are mounted sprocket wheels 5 and 6 over which the sprocket chains 7 of the conveyer travel.

The sprockets 6 are the ones to which power is applied, for driving the conveyer. The conveyer is supported by a suitable support 8, secured between the side bars of the frame, and is provided with a number of transversely-arranged carriers 9, shaped to receive the jars or bottles. Situated beneath the traveling conveyer is a fixed support 10 provided with cushioning disks 11, which are arranged directly below the sealing-heads, so that when the conveyer is brought to a stop to permit the sealing operation to be effected the jars or bottles will be directly over the disks.

The shaft 12 of the sprocket wheel 6 is extended laterally for some distance from the conveyer frame, where one of its ends is mounted in a bearing 13 in a standard 14. Keyed to this shaft 12 by a key 15, is a bushing 16, integral with which is an arm 16′, carrying at its upper end a bolt 17, extending through an aperture 18 in the arm and through a curved slot 19 in a web 20 formed between the spokes of a spacing-wheel 21 having on its periphery a series of notches 22, which successively receive the pointed end of a pawl 23, pivotally mounted upon a rockable arm 24 loosely mounted upon the shaft 12. This pawl is kept normally elevated and in contact with the periphery of the wheel 21 by a spring 25.

The upper end of the standard 14 is provided with a segmental projection 26 having a slot 27 therein, through which passes the bolt 28, which bolt also passes through the hole in an arm 29 loosely mounted upon the shaft 12. The outer end of this arm carries a pivoted pawl 30, whose pointed end 31 is kept in engagement with the periphery of the spacing-wheel 21, by a weight 32, and the purpose of this pawl is to prevent slight retrograde movement of the conveyer at points of stoppage, or in other words, insure exactly the same degree of movement of the conveyer with each sealing operation, and the bolt 28 permits of adjustment of this pawl to correspond with adjustments of the conveyer, to accommodate it to the different movements required for capping jars of different diameters.

Obviously, the bolt 17 passing through the slot 19 in the spacing-wheel, will permit of an adjustment of the wheel 21 upon the bushing 16 for the same purposes as those described with regard to the pawl 30, as will be more fully described in describing the operation of the machine. The arm 24 is extended below the pivotal point of the pawl 23, and pivotally connected to its end is one end of a connecting rod 33, whose other end is connected with a short crank pin 34 held in an adjustable block 35 in a correspondingly shaped recess 36, in the crank arm 37. This crank arm is keyed to a transverse shaft 38 mounted in suitable bearings in the hollow standards 39. Keyed to this shaft is a gear wheel 40, which meshes with a pinion 41 upon the main driving shaft 42, mounted in suitable bearings 43, best shown in Fig. 3 of the drawings.

The driving shaft carries at one end a driving pulley 44 and at its opposite end a pinion 45, meshing with a gear-wheel 46, mounted upon a second transverse shaft 47, and it is through these pinions 41 and 45, and the wheels 40 and 46, that the desired reciprocatory motion is given to the sealing heads, as will be now described.

The mechanism for operating the two sealing heads is duplicated and for convenience of description and clearness of understanding the construction and operation, only one set of parts will be described, preferably the one operated through the gear 40 and through which the section in Fig. 2 is taken.

Referring now particularly to Fig. 2, the numeral 48 designates two cams mounted upon the shaft 38, which mounting may be adjustable or otherwise, as preferred. These cams revolve with the shaft 38 and are contained within cam boxes 49, rigidly secured to the extensions 50 of reciprocating sleeves 51 which reciprocate in unison within the hollow standards 39, the reciprocatory movement being given by the cams 48. The surfaces of the cams 48 are kept in contact with the portions of the cam boxes 49 by springs 52 having their lower ends connected with the cam boxes and the upper ends suitably secured to the hollow standards 39. Thus it will be seen that the normal position of the reciprocating sleeve is the uppermost position of their stroke, so that the portion of the sealing head carried by the sleeves is depressed in the sealing operation. Attached to the upper ends of the reciprocating sleeves is a cross bar 53 which carries a crimping sleeve 54 of which more will be said further along.

Mounted upon the shaft 38, adjacent to the cams 48 are two other cams 55 which are connected to the shaft in a manner like that described for the cams 48 and like the cams 48, those cams are contained within cam boxes 56, connected with the lower ends of reciprocating rods 57, which work through reciprocating sleeves 51. As in the case of the cams 48, these cam boxes 56 are held in contact with the surfaces of the cams by spiral springs 55' having one end connected with the cam box and the other to the hollow standards. To the upper ends of the rods 57, I attach a cross bar 58 which carries a casing 59 and contained parts of the sealing head, that will be now described.

Within the casing 59 is a bore 60 which contains a sealing spring 61 with its upper end resting against a screw cap 62 and its lower end upon a cross head 63 which cross head is attached to the shank 64 of the sealing plunger 65, the cross head resting upon shoulder 66 of the head casing, which shoulder limits the downward movement of the plunger. The shank of the plunger extends through the aperture 67 in the casing 59. The lower end of the plunger is recessed as shown at 70 and made to conform with the outer contour of the cap, which is received within the recess in the capping operation. The plunger is provided with an annular flange 71 having therein an annular recess 72, whose counterpart is in a ring 73 threaded upon the shank of the plunger. Held between the flange 71 and the ring 73 are the upper ends of a series of seal indenting fingers 74 which are provided at their lower ends with seal indenting points 75 and these fingers are provided with cam surfaces 76, in the form of downwardly extending bevels. As shown more clearly in Fig. 11, the upper ends of the fingers are provided with cylindrical heads which rest loosely in a groove between the flange 71 and ring 73 and each cylindrical portion is provided with a short extension 77 of reduced diameter, the extensions of one finger abutting against the extensions of the next, thus suitably spacing the fingers apart, so that the flange of the cap will be indented at the proper intervals. The lower ends of the fingers, as will be seen by reference particularly to Figs. 2 and 9, normally rest just below the edge of the plunger-head and in position to be forced simultaneously inward in the sealing operation, as will be described. The crimping sleeve 54 carried by the cross bar 53 is suitably recessed to permit the free working of the parts of the sealing head, which are within it, and this sleeve is adapted to slide relatively to and upon the casing 59 carried by the cross bar 58. Within an annular recess 78, within the sleeve 54 is a split resillient ring 79, which in the downward movement of the sealing head, parts and at the proper time, is adapted to operate upon the cam surfaces 76 of the seal locking fingers, to cause them to be moved simultaneously inward to lock the seal. The recess 78 is of such size, that the ring may have a slight upward movement before exerting a contracting pressure upon the fingers, as obviously the initial downward movement of the sleeve 54 will cause the fingers to lift the ring to the top of the recess, where it remains in a position to force all of the fingers inward in the final downward movement.

It will be noted that cams 48, which reciprocate the sleeves 51, are slightly longer than cams 55 which reciprocate the rods 57, and the respective cams are so positioned on their shafts, relatively to each other, that cams 55 will begin operation before cams 48, causing a downward movement of the bar 58 and a corresponding movement of the casing 59, until the lower edge of casing 59 contacts with the upper edge of casing 54, at which point further downward movement of casing 59 is prevented by the adjustable stops 80. The cams 48 now begin operation, causing the bar 53 and its attached casing 54 to move downward to effect the sealing operation, after which the casing 59 and sleeve 54 are slightly separated, and that as the casing 54 is moved up into contact with the casing 59 before the casing 59 is moved upward, the crimping jaws are released.

I prefer to provide the rods 57 with adjustable stops 80 to limit the downward movement of the parts of the sealing head, carried by the cross bar 58, so that just the desired and required pressure may be brought to bear upon the cap in seating the same upon the jar, this pressure being not much, if any, in excess of that required to properly compress the gasket within the cap.

I do not prefer an integral construction for the cross bars 53 and 58 and have therefore provided them with flanges 81, perforated for the reception of bolts 82. With this construction, sealing heads of different sizes may be used in the machine, as in the case of where it is desired to seal jars having filling apertures of different sizes, which of course require the use of caps of different sizes.

In connection with the described mechanism, and in sealing jars containing the food products, which jars are passed through certain heating apparatus after filling, I show heating ovens 83, suitably mounted upon the machine frame, and having connections 84 with suitable sources of heat supply. However, since the present invention does not reside in the heating apparatus, so far as any specific construction of such apparatus is concerned, no further description need be given of such apparatus.

In operation, the jars are placed upon the table support 10, over which the cross pieces 9 are drawn by the sprocket chain. These cross pieces are so positioned that at points of stoppage of the conveyer, the jars will be beneath the sealing heads. Power being applied to the main driving shaft 42, motion will be communicated through the gears 40 and 46 to the shafts 38 and 47. The revolution of the shafts 47 and 38 will cause the cams to operate upon the reciprocating sleeves 51 and rods 57, thereby giving reciprocatory movement to the parts of the sealing heads, and revolution of the shaft 38 will communicate motion through the connecting rod 33 to the swinging arm 24, which will be oscillated or swung as the crank 37 rotates, thus successively taking the pawl 23 out of one of the notches in the spacing-wheel and carrying it backward to the next succeeding notch in the spacing-wheel, when a further movement of the crank will cause the wheel to revolve through the instrumentality of the pawl, thus moving the conveyer the required distance to bring the jars successively into sealing position under the sealing heads. Upon a further movement of the crank, the pawl will pass idly over the surface of the spacing-wheel between the notches, at which time the conveyer will be at rest, and at such time, the sealing operation is performed.

As has been suggested in the description, the pawl 31 is adjusted to take hold in the notch which has just been engaged by the stepping pawl to prevent retrograde movement of the conveyer, as it is obvious that it is essential that the jars be brought directly under the centers of the sealing heads at each point of stoppage of the conveyer.

From the foregoing description the operation of the machine will be readily understood, and it being only necessary to state that the casings 59 and 54 first move down together; then the casing 59 is halted and the casing 54 continues to move downward until the crimping-fingers act to crimp the cap to the bottle-neck. The casing 54 then returns so as to allow the crimping-fingers to become disengaged from the cap, and when the fingers are disengaged, the casing 54 and the casing 59 are moved together to raise the sealing-head from the bottle.

This mechanism I have contrived to prevent an excessive pressure being applied to the jar or such pressure as would break the jar in the sealing operation. In other words, instead of making the head parts integral and moving the whole head down together, both to perform the seating operation and requiring a still further movement of the same head part to effect the sealing or crimping operation, I separate them so that the vertical sealing pressure which I have under control is not in any way increased by the mechanism which merely causes a lateral movement of the locking fingers, to crimp the flange. This construction I have found highly advantageous in operating upon large mouthed receptacles where heavy sealing heads are required, somewhat out of proportion to the strength of the glass jar or bottle operated upon, for obviously, where the glass is of a given or usual thickness, spread out to a considerable extent, as necessary in the manufacture of a large mouthed jar, the lateral pressure of the seal locking fingers is very great, when combined with the capseating pressure, so great that the jar is apt to be fractured. Now, in the present construction, there is no such breaking tendency, and practice has demonstrated that the construction completely eliminates this danger.

Having thus described my said invention, what I claim is:—

1. A bottle-capping machine, having in combination, a conveyer, a capping device situated in the path of movement of the conveyer, a spacing-wheel loosely-mounted on one of the conveyer-shafts, an arm secured on said shaft, an adjustable connection between said arm and the spacing wheel, whereby the conveyer may be adjusted so as to center bottles of different diameters under the capping-device, and means for imparting motion to the spacing-wheel to move the conveyer.

2. A bottle-capping machine, having in combination a conveyer, a capping-device situated in the path of movement of the conveyer, a notched spacing-wheel loosely-mounted on one of the conveyer shafts, an arm secured on said shaft, an adjustable connection between said arm and the spacing-wheel, means for imparting motion to the spacing-wheel so as to move the conveyer, and means preventing a retrograde movement of the spacing-wheel.

3. A bottle-capping machine, having in combination a conveyer, a capping-device situated in the path of movement of the conveyer, a peripherally-notched spacing-wheel mounted loosely on one of the shafts of the conveyer, an arm mounted on said shaft and adjustably connected to the spacing-wheel, a rockable arm loosely-mounted on the conveyer shaft, a spring-pressed pawl pivoted on the rockable-arm and adapted to engage the notches in the spacing-wheel, and means for imparting motion to the rockable-arm to cause the pawl to move the spacing-wheel and thereby the conveyer.

4. A bottle-capping machine, having in combination, a conveyer, a capping-device situated in the path of movement of the conveyer, a peripherally-notched spacing-wheel loosely-mounted on one of the conveyer-shafts, an arm mounted on said shaft and adjustably-connected to the spacing-wheel, a rockable-arm loosely-mounted on the conveyer-shaft and carrying a spring-pressed pawl adapted to engage the notches in the spacing-wheel, means for imparting motion to the rockable-arm to cause the pawl to actuate the spacing-wheel and thereby move the conveyer, and means for preventing a retrograde movement of the spacing-wheel.

5. A bottle-capping machine, having in combination a conveyer, a capping-device situated in the path of movement of the conveyer, a spacing-wheel loosely-mounted on one of the conveyer-shafts, an arm secured on said shaft and adjustably-connected to the spacing-wheel, a rockable-arm loosely-mounted on the conveyer-shaft and provided with a spring-pressed pawl adapted to engage the notches of the spacing-wheel, means for rocking said arm to cause the pawl to move the spacing-wheel step-by-step, and thereby the conveyer, an arm loosely-mounted on the conveyer-shaft and provided at its outer end with a weighted pawl, a fixed slotted segment adjustably connected with said arm, whereby the weighted pawl may be adjusted to correspond with the adjustment of the conveyer.

In testimony whereof I affix my signature in presence of two witnesses.

EDWARD D. SCHMITT.

Witnesses:
JAMES L. CRAWFORD,
FRANK G. BRENTON.